US012584463B2

(12) United States Patent
Sulaiman

(10) Patent No.: US 12,584,463 B2
(45) Date of Patent: Mar. 24, 2026

(54) ROTOR BLADE WITH LIGHTNING PROTECTION SYSTEM, WIND TURBINE AND ASSEMBLY METHOD

(71) Applicant: Siemens Gamesa Renewable Energy A/S, Brande (DK)

(72) Inventor: Sajeesh Sulaiman, Bangalore (IN)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/873,527

(22) PCT Filed: Jun. 2, 2023

(86) PCT No.: PCT/EP2023/064823
§ 371 (c)(1),
(2) Date: Dec. 10, 2024

(87) PCT Pub. No.: WO2023/241948
PCT Pub. Date: Dec. 21, 2023

(65) Prior Publication Data
US 2025/0354538 A1      Nov. 20, 2025

(30) Foreign Application Priority Data
Jun. 17, 2022    (EP) .................................... 22179706

(51) Int. Cl.
*F03D 80/30*          (2016.01)
*F03D 1/06*           (2006.01)
(Continued)

(52) U.S. Cl.
CPC ...........  *F03D 80/30* (2016.05); *F03D 1/0647* (2023.08); *F03D 13/104* (2023.08); *F03D 80/70* (2016.05); *F05B 2230/60* (2013.01)

(58) Field of Classification Search
CPC ....... F03D 80/30; F03D 1/0647; F03D 1/0658
See application file for complete search history.

(56) References Cited

U.S. PATENT DOCUMENTS 9,631,502 B2 *   4/2017  Zeller .................... F03D 80/30
2007/0253819 A1   11/2007  Doorenspleet et al.
(Continued)

FOREIGN PATENT DOCUMENTS

DE     102008045939 B4     2/2013
EP         2889477 A1     7/2015
(Continued)

OTHER PUBLICATIONS

European Search Report and Written Opinion of European Patent Office dated Nov. 18, 2022 corresponding to Application No. 22179706.1.
(Continued)

*Primary Examiner* — Justin D Seabe

(57)      ABSTRACT
The present invention relates to a rotor blade (1) for a wind turbine (2), the rotor blade (1) comprising a first down conductor (6), extending from a tip section (3) to a root section (4), wherein the first down conductor (6) is electrically coupled with a root block (7) of the root section (4), wherein the root block (7) is electrically coupled with a second down conductor (8). The second down connector (8) is electrically coupled with a current distribution plate (9), wherein the current distribution plate (9) is attached to a fixation device (10) for fixing the rotor blade (1) to a first bearing ring (11a) of a bearing (11) of a hub (12). The invention also relates to a wind turbine (2) and to a method for assembling a rotor blade (1) to a hub (12) of a wind turbine (2) and establishing a conductive path between a first down connector (6) of the rotor blade (1) and the hub (12).

11 Claims, 6 Drawing Sheets

Figure 1:
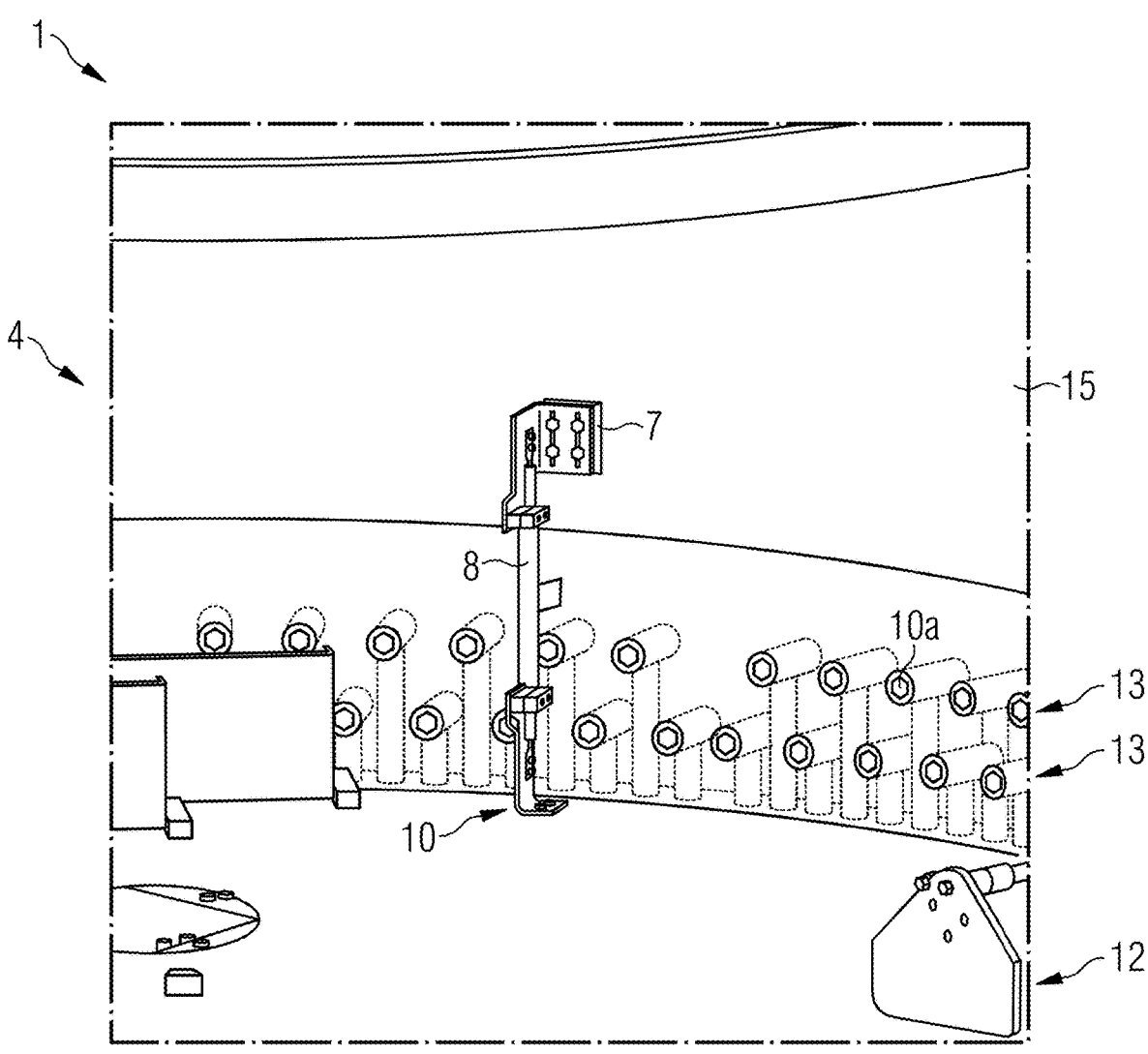

(51) Int. Cl.
    *F03D 13/10*        (2016.01)
    *F03D 80/70*        (2016.01)

(56)           References Cited

U.S. PATENT DOCUMENTS

| | | | |
|---|---|---|---|
| 2014/0271190 A1 * | 9/2014 | Hansen | F03D 80/30 |
| | | | 416/3 |
| 2015/0167642 A1 | 6/2015 | Hansen | |
| 2020/0378358 A1 * | 12/2020 | Devaraj | F03D 80/30 |

FOREIGN PATENT DOCUMENTS

| | | | | |
|---|---|---|---|---|
| EP | 2783110 B1 | 4/2016 | | |
| EP | 3421787 A1 * | 1/2019 | .......... | F03D 1/0675 |
| WO | WO-2018050196 A1 * | 3/2018 | .......... | F03D 1/0675 |

OTHER PUBLICATIONS

PCT International Search Report and Written Opinion of International Searching Authority mailed Sep. 1, 2023 corresponding to PCT International Application No. PCT/EP2023/064823 filed Jun. 2, 2023.

* cited by examiner

23

1

2

12

19

18

17

100        200        300        400

ROTOR BLADE WITH LIGHTNING PROTECTION SYSTEM, WIND TURBINE AND ASSEMBLY METHOD

The present invention relates to a rotor blade for a wind turbine. The invention also relates to a wind turbine with a generic turbine blade. Furthermore, the invention relates to a method for assembling a rotor blade to a hub of a wind turbine and establishing a conductive path between a first down connector of the rotor blade and the hub.

A major challenge in the development of modern wind turbines is the protection of the wind turbine from lightning. Wind turbines usually are the tallest constructions in the area they are located in, especially in offshore wind farms. Therefore, the probability of being hit by lightning is very high. Predominantly, the lightning strikes the tallest point that is normally a tip section of a rotor blade of the wind turbine.

The development of wind turbines, especially for offshore wind farms, is directed to an increase of power generation. This leads to an increase of the size of the generators, rotor blades towers and, consequently, the overall size of the wind turbines. As an inevitable drawback, however, the likeliness of attracting a lightning strike rises with the height of the wind turbine, because the attraction of lightning strikes rises with the height of an object. As a consequence, the importance of reliable lightning protection systems increases with the increase of height of the wind turbines.

In modern wind turbines, lightning protection systems with a huge network of down conductor systems are used to protect the wind turbine from lightning strikes. Such down connector systems expand from the outer tip section of the turbine blade, which will be the tallest point of the wind turbine when the rotor blade is oriented vertically upwards, to a base of the tower of the wind turbine.

Besides this enormous, complex down connector network that allows easy flow of high amplitude lightning current, the shape and design of such down connectors and brackets also play a crucial role in long-term transferring of lightning current.

A potential weak point of a wind turbine with a lightning protection system is the lightning transfer system from the rotor blade to the hub, since it usually has a direct impact on the installation procedure of wind turbines when the rotor blades are assembled to the hub and the electrical coupling between the down conductor system of the rotor blade with the down connector system of the hub has to be established.

Installation of rotor blades for wind turbines, especially for large offshore wind turbines, is an operation that requires a lot of effort and thorough planning. The assembly task requires the use of specialized cranes, wherein the operation costs for these cranes are enormously high. Hence, it is of major importance that the wind turbine design is optimized for the assembly procedure in order to reduce the assembly time and, by these means, reduce the required operation time for such cranes. By reducing the operation time of the crane, the assembly costs of the wind turbine can be reduced as well.

According to the state of the art, the coupling of the down connector system of the rotor blade with the down connector system of the hub is performed separately from the mechanical coupling of the rotor blade with the hub. According to a popular design, the rotor blade is connected to a bearing ring of a bearing of the hub, and the down connector of the rotor blade is connected to the hub by a separate connection plate. For this process, several bolts are used. The duration of the electrical coupling of the down connectors may take between 10 and 15 minutes per rotor blade. For a standard wind turbine with three rotor blades, this sums up to 30 up to 45 minutes. During this time, the crane needs to wait until the next rotor blade can be mounted. The additional costs for this idle time vary between 20 k to 25 k Euros.

Another coupling between the down connector of the rotor blade and the down connector of the hub is known from the document EP 2783110 B1. The rotor blade down connector is located inside a central rotor blade chamber. In the root section, a radially extending first conductor element is provided for electronically coupling the down connector of the rotor blade with a root bushing of the rotor blade. A radially extending second conductor element is provided for electronically coupling the root bushing with a down connector of the hub. This system has the disadvantage that an additional assembly step of connecting the down connector of the hub with the second conductor element is necessary. Beyond that, this solution requires additional structural modifications, such as axially extending bores, in the root section of the rotor blade, causing potential weak points of the structure of the rotor blade.

It is therefore the object of the present invention to eliminate or at least partially eliminate the disadvantages described above in the case of a wind turbine. In particular, it is the object of the present invention to create a rotor blade for a wind turbine, a wind turbine and a method for assembling a rotor blade to a hub of a wind turbine which provides for an improved assembly in a simple and inexpensive manner.

The above object is achieved by the claims. Accordingly, the problem is solved by a rotor blade for a wind turbine with the features of independent claim 1, by a wind turbine with the features of subordinate claim 8 and by a method for assembling a rotor blade to a hub of a wind turbine and establishing a conductive path between a first down connector of the rotor blade and the hub with the features of subordinate claim 10. Further features and details of the invention emerge from the sub claims, the description and the drawings. Features and details that are described in connection with the rotor blade according to the invention naturally also apply in connection with the wind turbine according to the invention as well as the method according to the invention and vice versa, so that with regard to the disclosure of the individual aspects of the invention, reference is or can always be made to each other.

According to a first aspect of the invention, the object is achieved by a rotor blade for a wind turbine, the rotor blade comprising a tip section, a root section and an intermediate section between the tip section and the root section. The rotor blade further comprises a first down conductor, extending from the tip section to the root section, wherein the first down conductor is electrically coupled with a root block of the root section. The root block is electrically coupled with a second down conductor.

According to the invention, the second down connector is electrically coupled with a current distribution plate, wherein the current distribution plate is attached to a fixation device for fixing the rotor blade to a first bearing ring of a bearing of a hub.

The rotor blade is preferable designed as a composite laminate with reinforcement fibers, such as glass fibers, carbon fibers or the like, and matrix material, such as resin or the like. The rotor blade comprises a plurality of sections, such as the tip section, the intermediate section and the root section. In a mounted state, the tip section points away from the hub of the wind turbine. Preferably, a lightning receiving end of the first down conductor or a lightning receiving device which is electrically coupled to the first down connector, protrudes from the tip section in a direction pointing away from the root section. Thus, during operation of the wind turbine, a lightning strike can be transferred directly to the first down connector.

The first down connector is preferably integrated into a wall of the rotor blade, preferably by a laminating process for manufacturing the rotor blade. The first down connector preferably ends in the root section of the rotor blade, preferably spaced apart from the fixation means for fixing the rotor blade to the hub. Thus, the structure of the rotor blade in the area of the fixation means is not further weakened by the first down connector.

In the root section, the first down connector is electrically coupled with the root block. The root block is configured to provide an electrical coupling between the first down connector and an inside chamber of the rotor blade. The root block is preferably integrated into the wall of the rotor blade, preferably by the laminating process for manufacturing the rotor blade.

The second down connector is electrically coupled with the root block, preferably by screws, bolts, welding or the like. Alternatively, the second down connector can be integrally formed with the root block. Preferably, the second down connector is spaced apart from the wall of the rotor blade. The second down connector is electrically coupled with the current distribution plate.

The root section is configured for being mounted to the first bearing ring of the hub of the wind turbine by a plurality of fixation devices. Preferably, the fixation devices are, especially evenly, distributed over a circumference of the root section. The fixation devices preferably comprise a barrel nut, arranged in a radially extending bore of the rotor blade. The plurality of bores is distributed, especially evenly, around the circumference of the rotor blade, preferably in two adjacent rows. Each barrel nut comprises a treaded portion for fixation of a threaded stud. Preferably, the threaded studs are protruding from the root section of rotor blade in a direction parallel to a longitudinal axis of the rotor blade. The threaded studs are configured to be inserted into through holes of the first bearing ring, especially an inner bearing ring, of the hub, and to be fixed to the first bearing ring by nuts.

The current distribution plate extends to the fixation device for fixing the rotor blade to the hub. Moreover, the current distribution plate is mechanically coupled to the fixation device. When the fixation device comprises a barrel nut, it is preferred that the current distribution plate is mechanically fixed to the barrel nut, preferably by a screw, bolt or the like. By these means, the electrical coupling between the first down connector and the barrel nut is established.

The material of the first down connector and/or second down connector and/or root block and/or current distribution plate is preferably selected for improved conductivity, in order to conduct the high current of a lightning strike without overheating due to an inert electrical resistance. Preferred materials for this purpose are copper, stainless steel, aluminum or the like.

A rotor blade according to the invention has the advantage over conventional rotor blades that in a simple and inexpensive way, the assembly to a hub of a wind turbine is improved. Since the current distribution plate is already attached to the fixation device during production of the rotor blade, at the construction site, just the rotor blade needs to be assembled to the hub by the fixation devices and, advantageously, during this process, the electrical coupling of the rotor blade lightning protection devices with the hub, namely the bearing of the hub, is automatically established without the need of further assembly steps. Thus, the time for the installation procedure at the construction site can be reduced significantly and, thereby, the costs for a special crane can be reduced as well.

According to a preferred further development of the invention, the rotor blade can provide that the current distribution plate is attached to three fixation devices for fixing the rotor blade to the first bearing ring of the hub. When the fixation device comprises a barrel nut, it is preferred that the current distribution plate is mechanically fixed to the three barrel nuts, preferably by a screw, bolt or the like each. By these means, the electrical coupling between the first down connector and the three barrel nuts is established. This has the advantage that in a simple and inexpensive way, the current flow from the current distribution plate is divided to three fixation devices and the electrical stress of each fixation device is reduced. Therefore, the risk of the rotor blade taking damage from a lightning strike is further reduced.

It is preferred that the current distribution plate is attached to three barrel nuts of the fixation device, wherein the barrel nuts are disposed in two different barrel nut rings of the rotor blade. Each barrel nut ring comprises a plurality of barrel nuts, distributed, especially evenly, over the circumference of the rotor blade. Thus, the current distribution plate is attached to two adjacent barrel nuts of a first barrel nut ring and one adjacent barrel nut of a second barrel nut ring. Preferably, the barrel nuts of the two barrel nut rings are provided with an offset between the two barrel nut rings. The offset is preferably such that the barrel nut of the second barrel nut ring is disposed in the middle of the two adjacent barrel nuts of the first barrel nut ring with respect to a circumferential direction of the rotor blade. Moreover, the barrel nut rings are mutually spaced apart with respect to an axial direction of the rotor blade. In other words, it is preferred that imaginary connecting lines between center points of the involved barrel nuts form an isosceles triangle. This has the advantage that in a simple and inexpensive way, the current flow from the current distribution plate is divided into three barrel nuts and three threaded studs, wherein the electrical stress for each barrel nut and threaded stud is reduced. Therefore, the risk of the rotor blade taking damage from a lightning strike is further reduced.

More preferred, the current distribution plate comprises a stress compensation section between the barrel nut rings. A stress compensation section can be understood as a section which is configured for compensating a relative tolerance between the two barrel nut rings. Such tolerance can occur due to manufacturing problems, mechanical stress, thermal expansion or the like. Preferably, the stress compensation section comprises a bent and/or kinked area to better allow a relative movement of the barrel nuts of the different barrel nut rings. Additionally or alternatively, the stress compensation section can comprise a reduced thickness and/or width of the current distribution plate. This has the advantage that in a simple and inexpensive way, the pre-assembly of the rotor blade can be improved and the risk of damages to the wall of the rotor blade, the barrel nuts and the current distribution plate due to stress, e.g., due to different thermal expansion of the wall and the plate, especially due to a lightning strike, can be reduced.

In a particularly preferred embodiment of the invention, a spacer is provided between the second down connector and a wall of the rotor blade in the root section between the root block and the current distribution plate. Preferably, the spacer is made of an electrically non-conductive material. Preferably, the spacer is laminated to the wall, especially during the process of laminating the wall of the rotor blade. The spacer has the technical effect to ensure a safe distance between the second down connector and the wall in order to avoid an uncontrollable lightning jump between the second down connector and the wall. This has the advantage that in a simple and inexpensive way, the risk of the rotor blade taking damage from a lightning strike is further reduced.

Preferably, the second down connector is clamped or screwed to the current distribution plate. In a preferred embodiment, the second down connector comprises a wire eye, wherein the wire eye is screwed or bolted to the current distribution plate. In another preferred embodiment, the second down connector is clamped between a fixation plate and the current distribution plate, wherein the fixation plate is preferably screwed or bolted to the current distribution plate. This has the advantage that in a simple and inexpensive way, a tolerance compensation for attaching the current distribution plate to the fixation device can be provided. Thus, the preassembly of the rotor blade is improved.

According to a preferred embodiment of the invention, the second down connector is attached to the root block by a connection plate. Preferably, the second down connector is clamped between the connection plate and the root block. The connection plate is preferably screwed to the root block. This has the advantage that in a simple and inexpensive way, a tolerance compensation for attaching the current distribution plate to the fixation device can be provided. Thus, the pre-assembly of the rotor blade is improved.

According to a second aspect of the invention, the object is achieved by a wind turbine, the wind turbine comprising a base, a tower, a nacelle and a hub, wherein the hub is rotatably mounted to the nacelle and coupled to a generator for transforming mechanical energy into electric energy. According to the invention, a rotor blade according to the first aspect of the invention is attached to a first bearing ring of the hub by a plurality of fixation devices.

It is preferred that the wind turbine comprises three rotor blades according to the first aspect of the invention, each attached to the first bearing ring of the hub by a plurality of fixation devices. Preferably, the fixation devices comprise barrel nuts, fixation studs and fixation nuts.

Due to the fixation of the rotor blade to the first bearing ring, preferably an inner bearing ring, the lightning protection system of the rotor blade is coupled with the bearing of the hub. Preferably, a second bearing ring of the hub is electrically coupled with a base down connector of the base. Thus, electrical current from a lightning strike can easily flow from the tip section of the rotor blade to the base of the wind turbine with a reduced risk for causing damages to components of the wind turbine.

The wind turbine according to the invention has all the advantages that have already been described for a rotor blade according to the first aspect of the invention. Accordingly, the wind turbine according to the invention has the advantage over conventional wind turbines that in a simple and inexpensive way, the assembly of the rotor blades to the hub of the wind turbine is improved. Since the current distribution plate is already attached to the fixation device during production of the rotor blade, at the construction site, just the rotor blade needs to be assembled to the hub by the fixation devices and, advantageously, during this process, the electrical coupling of the rotor blade lightning protection devices with the hub, namely the bearing of the hub, is automatically established without the need of further assembly steps. Thus, the time for the installation procedure at the construction site can be reduced significantly and, thereby, the costs for a special crane can be reduced as well.

It is preferred according to the invention that the first bearing ring is electrically connected to an electric current bypass device for providing a further conductive path from the first bearing ring to a second bearing ring of the bearing, thus electrically bypassing roller devices of the bearing. Preferably, the electric current bypass device comprises a bypass brush. It is further preferred that the bypass brush contacts the first bearing ring in a way to allow a relative rotation of the first bearing ring to the bypass brush. The bypass brush is preferably fixedly attached to the second bearing ring. In case of a lightning strike, a first part of the electric current from the first bearing ring will be transmitted to the second bearing ring via the electric current bypass device, and a second part of the electric current will be transmitted to the second bearing ring via roller devices of the bearing. This has the advantage that in a simple and inexpensive way, in case of a lightning strike, the stress to the roller devices of the bearing and, consequently, the risk of taking damages is reduced. Hence, the robustness of the wind turbine is further improved.

According to a third aspect of the invention, the object is achieved by a method for assembling a rotor blade to a hub of a wind turbine and establishing a conductive path between a first down connector of the rotor blade and the hub. The method comprises:

providing a hub with a bearing, the bearing comprising a first bearing ring and a second bearing ring, the hub being mounted on a tower, providing a rotor blade according to the first aspect of the invention, wherein fixation devices are provided at the root section of the rotor blade, passing end sections of the fixation devices though bores of the first bearing ring, and fixing the rotor blade to the first bearing ring by attaching fixation nuts to the end sections of the fixation devices.

Preferably, the fixation devices comprise barrel nuts and threaded studs, wherein the barrel nuts are located within a wall of the rotor blade in the root section of the rotor blade; each threaded stud is screwed into one barrel nut, and an opposite end of each threaded stud is guided through one bore of the first bearing ring and fixed to the first bearing ring by a nut.

The method according to the invention has all the advantages that have already been described for a rotor blade according to the first aspect of the invention and for a wind turbine according to the second aspect of the invention. Accordingly, the method according to the invention has the advantage over conventional methods that in a simple and inexpensive way, the assembly of the rotor blades to the hub of the wind turbine is improved. Since the current distribution plate is already attached to the fixation device during production of the rotor blade, at the construction site, just the rotor blade needs to be assembled to the hub by the fixation devices and, advantageously, during this process, the electrical coupling of the rotor blade lightning protection devices with the hub, namely the bearing of the hub, is automatically established without the need of further assembly steps. Thus, the time for the installation procedure at the construction site can be reduced significantly and, thereby, the costs for a special crane can be reduced as well.

Figure 2:
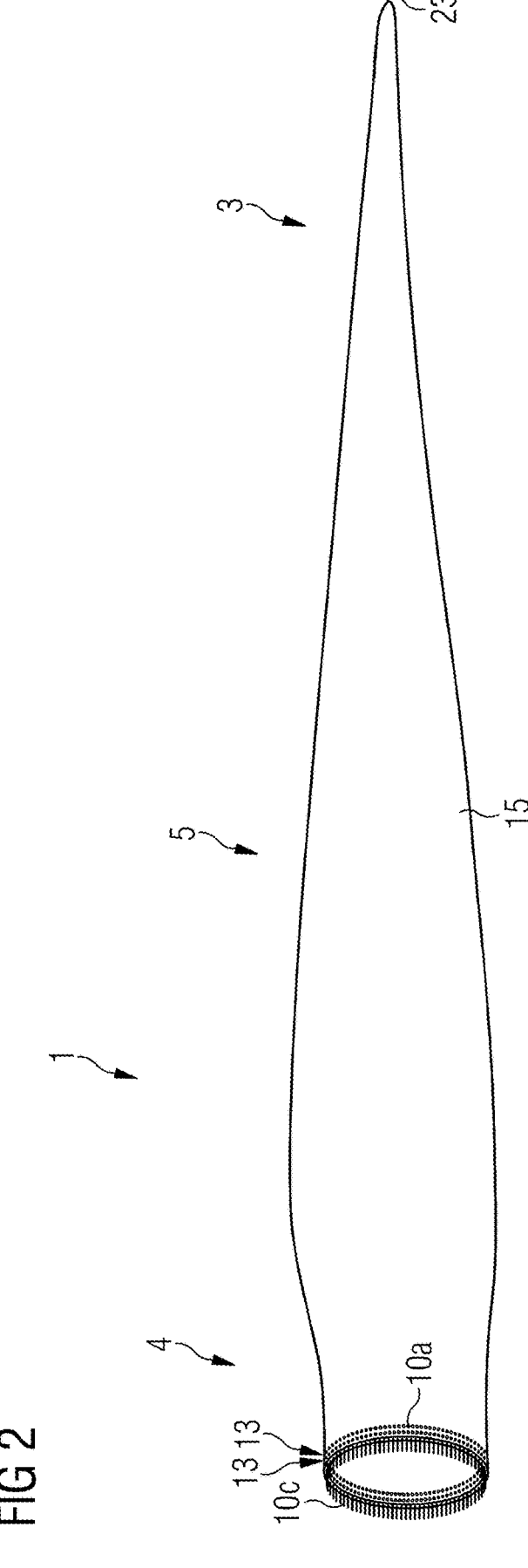
Figure 3:
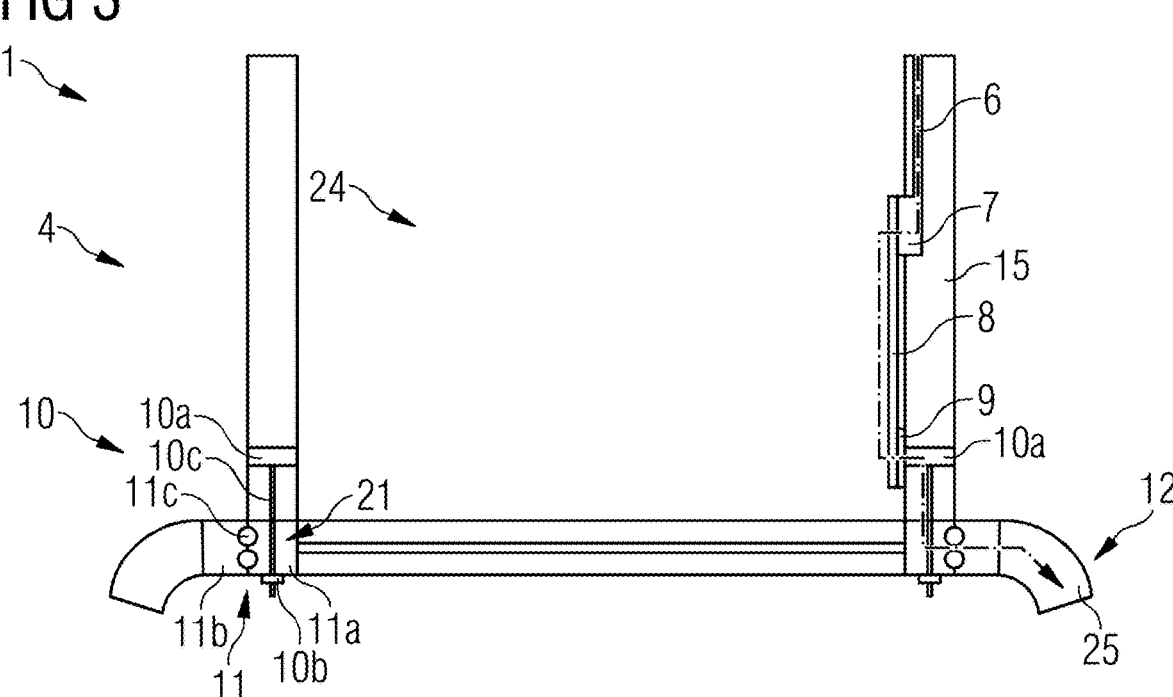
Figure 4:
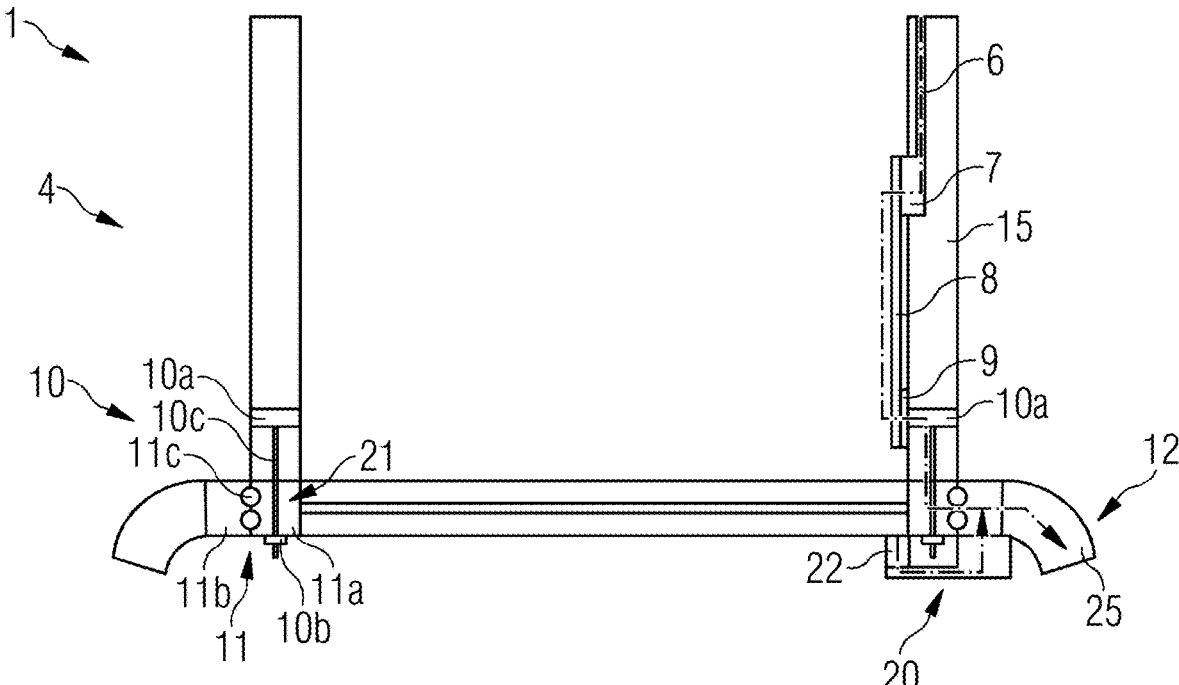
Figure 5:
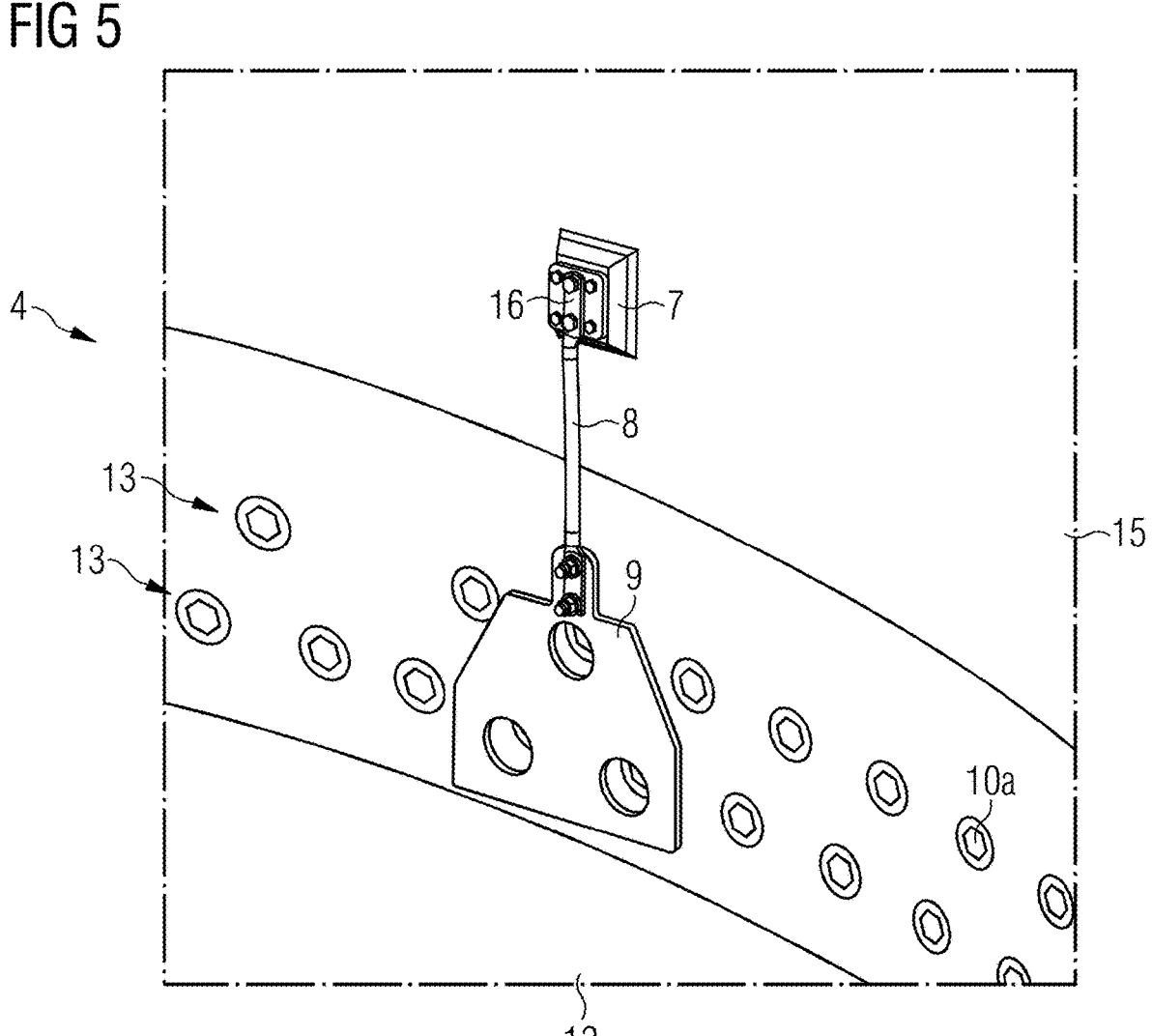
Figure 6:
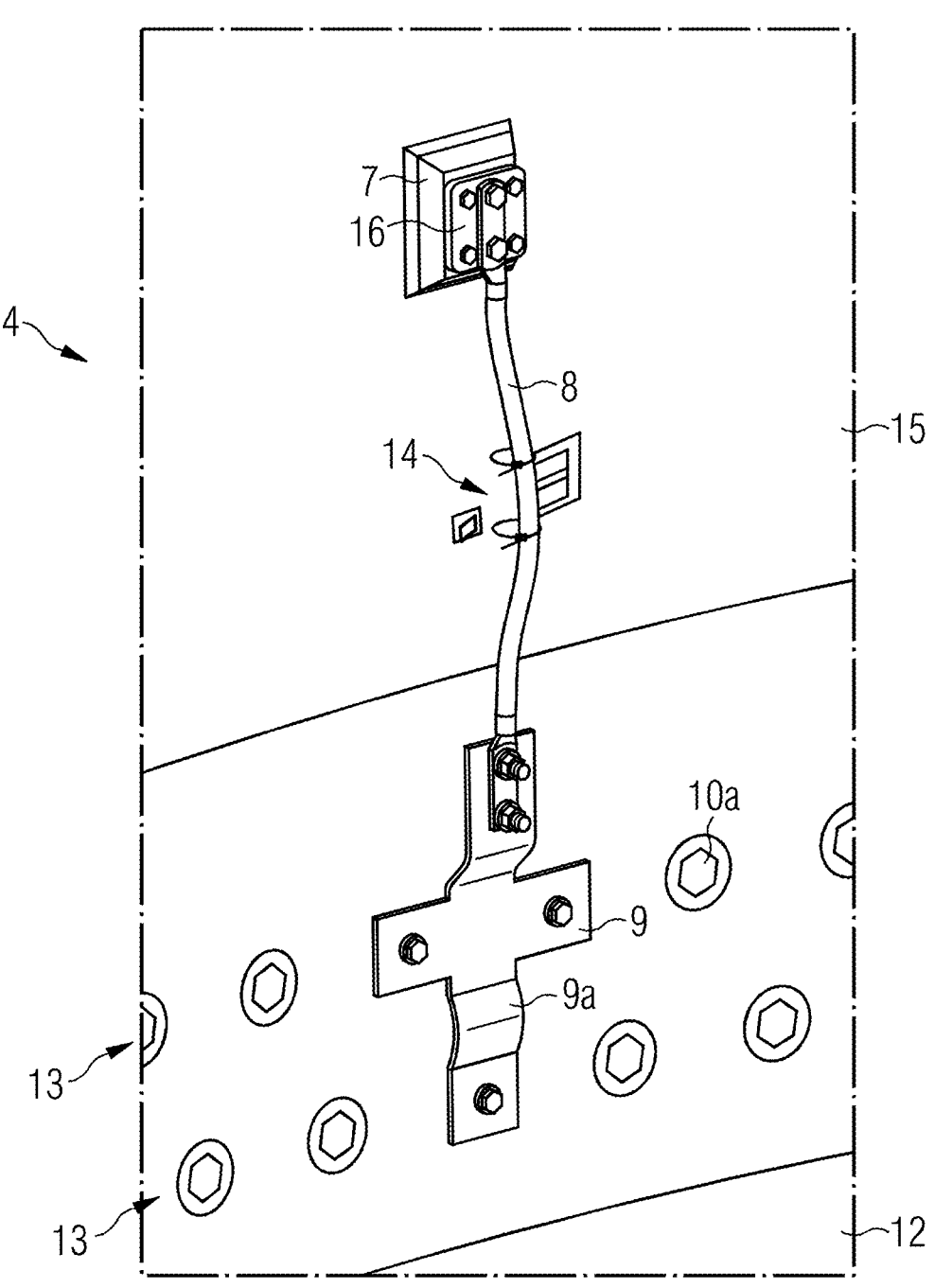
Figures 7, 8:
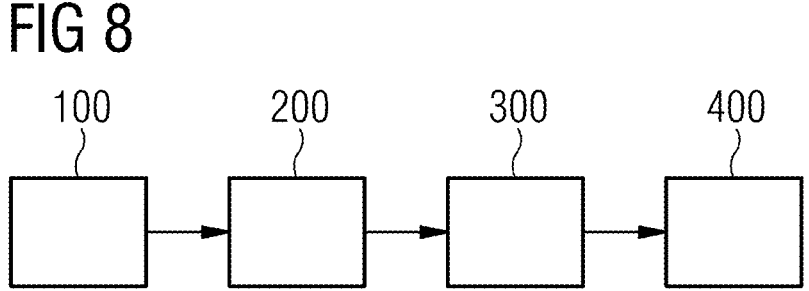

Further advantages, features and details of the invention unfold from the following description, in which by reference to drawings, working examples of the present invention are described in detail. Thereby, the features from the claims as well as the features mentioned in the description can be essential for the invention as taken alone or in an arbitrary combination. In the drawings:

FIG. 1 shows a schematic detail view of a root section of a rotor blade after assembly to a hub according to the prior art, FIG. 2 shows a schematic side view of a preferred embodiment of a rotor blade according to the invention, FIG. 3 shows a schematic detail view of a root section of a rotor blade after assembly to a hub according to a preferred first embodiment of the invention, FIG. 4 shows a schematic detail view of a root section of a rotor blade after assembly to a hub according to a preferred second embodiment of the invention, FIG. 5 shows a schematic detail view of a root section of a rotor blade after assembly to a hub according to a preferred third embodiment of the invention, FIG. 6 shows a schematic detail view of a root section of a rotor blade after assembly to a hub according to a preferred fourth embodiment of the invention, FIG. 7 shows a schematic front view of a preferred embodiment of a wind turbine according to the invention, and FIG. 8 shows a schematic flow chart of a preferred embodiment of a method according to the invention.

Elements with the same function and effectiveness are denoted each in FIGS. 1-8 with the same reference numbers.

In FIG. 1, a root section 4 of a rotor blade 1 after assembly to a hub 12 according to the prior art is presented in a schematic detail view. A second down conductor 8 of a lightning protection system of the rotor blade 1 is mounted with a first end to a root block 7 and with a second end to the hub 12 by a plurality of fixation devices 10, such as screws. The root block 7 is integrated into a wall 15 of the rotor blade 1. Moreover, the rotor blade 1 is fixed to the hub 12 by barrel nuts 10a in cooperation with not illustrated threaded studs 10c (cf. FIG. 3) and not illustrated fixation nuts 10b (cf. FIG. 3). The barrel nuts 10a are arranged in two barrel nut rings 13.

In FIG. 2, a preferred embodiment of a rotor blade 1 according to the invention is shown in a schematic side view. The rotor blade 1 comprises a tip section 3, a root section 4 and an intermediate section 5, located in between the tip section and the root section 4. In the tip section 3, a lightning receiver 23 protrudes through a wall 15 of the rotor blade 1. The lightning receiver 23 is electrically coupled with a not shown first down conductor 6 (cf. FIG. 3) of the rotor blade 1. In the root section 4, two barrel nut rings 13 with barrel nuts 10a are provided. Each barrel nut 10a is mechanically coupled with a threaded stud 10c. The threaded studs 10c protrude from the root section 4 facing away from the intermediate section 5. In this state, the rotor blade 1 is configured for being assembled to a hub 12 (cf. FIG. 3) of a wind turbine 2 (cf. FIG. 7).

A root section 4 of a rotor blade 1 after assembly to a hub 12 according to a preferred first embodiment of the invention is illustrated in FIG. 3 in a schematic detail view. The rotor blade 1 is assembled to the hub 12 by a plurality of fixation devices 10. The fixation devices 10 comprise threaded studs 10c in cooperation with barrel nuts 10a, located in the wall 15 of the rotor blade 1. The threaded studs 10c are inserted in bores 21 of a first bearing ring 11a of a bearing 11 of the hub 12 and fixed to the first bearing ring 11a by fixation nuts 10b. The first bearing ring 11a is configured as an inner bearing ring of the bearing 11.

A first down conductor 6 for transmitting electrical energy of a lightning strike from the lightning receiver 23 (cf. FIG. 2) is embedded into the wall 15 of the rotor blade 1 and electrically coupled with a root block 7. The root block 7 is partly embedded into the wall 15 and protrudes to an inner chamber 24 of the rotor blade 1. A second down conductor 8 is located inside the inner chamber. The second down conductor 8 is electrically connected to the root block 7 and to a current distribution plate 9. The current distribution plate 9 is electrically coupled to several barrel nuts 10a, e.g., by not illustrated bolts or screws. Thus, by mounting the rotor blade 1 to the hub 12, an electrical path from the lightning receiver 23 through the first down conductor, the root block 7, the second down conductor 8, the current distribution plate 9, the barrel nuts 10a, the threaded studs 10c, the inner bearing ring 11a, roller devices 11c of the bearing 11 and a second bearing ring 11b of the bearing 11 to a main body 25 of the hub is automatically established without the need of further assembly steps. The second bearing ring 11b is configured as an outer bearing ring of the bearing 11.

FIG. 4 shows a root section 4 of a rotor blade 1 after assembly to a hub 12 according to a preferred second embodiment of the invention in a schematic detail view. The second embodiment corresponds to the first embodiment and further comprises an electric current bypass device 20 at the bearing 11 of the hub 12. The electric current bypass device 20 is fixedly attached to the second bearing ring 11b and comprises an electrically conductive brush 22, which is in contact with the first bearing ring 11a. By these means, the stress for the roller devices 11c in the cause of a lightning strike is reduced, since a part of the current from the first bearing ring 11a is transmitted via the electric current bypass device 20 to the second bearing ring 11b.

In FIG. 5, a root section 4 of a rotor blade 1 after assembly to a hub 12 according to a preferred third embodiment of the invention is illustrated in a schematic detail view. The second down conductor 8 is attached to the root block 7 by a connection plate 16, e.g., by not illustrated screws. The current distribution plate 9 is assigned to one barrel nut 10a of an—in this view—upper barrel nut ring 13 and two barrel nuts 10a of an—in this view—lower barrel nut ring 13. Alternatively, the current distribution plate 9 can be assigned to one or more barrel nuts 10a of the upper barrel nut ring 13 and to one or more barrel nuts 10a of the lower barrel nut ring 13.

FIG. 6 shows a root section 4 of a rotor blade 1 after assembly to a hub 12 according to a preferred fourth embodiment of the invention in a schematic detail view. The fourth embodiment corresponds to the third embodiment and differs in the formation of the current distribution plate 9. The current distribution plate 9 is assigned to two barrel nuts 10a of an—in this view—upper barrel nut ring 13 and one barrel nut 10a of an—in this view—lower barrel nut ring 13. Moreover, the current distribution plate 9 comprises a stress compensation section 9a between the two barrel nut rings 13 for compensation tension, e.g., caused by temperature differences due to a lightning strike. Alternatively, the current distribution plate 9 can be assigned to one or more barrel nuts 10a of the upper barrel nut ring 13 and to one or more barrel nuts 10a of the lower barrel nut ring 13. Furthermore, a spacer 14 is arranged between the second down conductor 8 and the wall 15 for keeping the second down conductor 8 securely spaced away from the wall 15.

A preferred embodiment of a wind turbine 2 according to the invention is shown in FIG. 7 in a schematic front view. The wind turbine 2 is configured for offshore deployment and comprises a base 17, a tower 18 and a nacelle 19 mounted onto the tower 18. At the nacelle 19, a hub 12 with three mounted rotor blades 1 according to the invention is arranged.

FIG. 8 shows a preferred embodiment of a method according to the invention in a schematic flow chart. In a first action 100, a hub 12, mounted onto a tower 18 is provided. The hub 12 comprises a plurality, preferably three, bearings 11 with a first bearing ring 11a, a second bearing ring 11b and a plurality of roller devices 11c each. In a second action 200, a rotor blade 1 according to the invention is provided. The rotor blade 1 comprises in a root section 4 a plurality of fixation devices 10, preferably barrel nuts 10a in cooperation with threaded studs 10c, for fixing the rotor blade 1 to the first bearing ring 11a. Preferably, all threaded studs 10c protrude from the rotor blade 1 in the same assembly direction, facing away from an intermediate section 5 of the rotor blade 1.

In a third action 300, end sections of the fixation devices 10, preferably of the threaded studs 10c, are passed though bores 21 of the first bearing ring 11a, preferably in a way that the end sections protrude from the bores 21.

In a fourth action 400, the rotor blade 1 is fixed to the first bearing ring 11a by attaching fixation nuts 10b to the end sections of the fixation devices 10, preferably to the protruding end sections of the threaded studs 10c.

Preferably, the second action 200 to the fourth action 400 is repeated for the assembly of the further rotor blades 1. By this means, the rotor blades 1 are assembled to the hub 12, and an electric coupling of the lightning receiver 23 with the hub 12 is established without further assembly actions.

The invention claimed is:

1. Rotor blade (1) for a wind turbine (2), the rotor blade (1) comprising a tip section (3), a root section (4) and an intermediate section (5) between the tip section (3) and the root section (4), wherein the rotor blade (1) further comprises a first down conductor (6), extending from the tip section (3) to the root section (4), wherein the first down conductor (6) is electrically coupled with a root block (7) of the root section (4), wherein the root block (7) is electrically coupled with a second down connector (8), wherein the second down connector (8) is electrically coupled with a current distribution plate (9), wherein the current distribution plate (9) is attached to a fixation device (10) for fixing the rotor blade (1) to a first bearing ring (11a) of a bearing (11) of a hub (12), wherein the current distribution plate (9) is attached to a plurality of barrel nuts (10a) of the fixation device (10), wherein the barrel nuts (10a) are disposed in two different barrel nut rings (13) of the rotor blade (1).

2. Rotor blade (1) according to claim 1, wherein the current distribution plate (9) is attached to three fixation devices (10) for fixing the rotor blade (1) to the first bearing ring (11a).

3. Rotor blade (1) according to claim 1, wherein the current distribution plate (9) comprises a stress compensation section (9a) between the barrel nut rings (13).

4. Rotor blade (1) according claim 1, wherein a spacer (14) is provided between the second down connector (8) and a wall (15) of the rotor blade (1) in the root section (4) between the root block (7) and the current distribution plate (9).

5. Rotor blade (1) according claim 1, wherein the second down connector (8) is clamped or screwed to the current distribution plate (9).

6. Rotor blade (1) according claim 1, wherein the second down connector (8) is attached to the root block (7) by a connection plate (16).

7. Wind turbine (2), comprising a base (17), a tower (18), a nacelle (19) and a hub (12), wherein the hub (12) is rotatably mounted to the nacelle (19) and coupled to a generator for transforming mechanical energy into electric energy, wherein a rotor blade (1) according to claim 1 is attached to a first bearing ring (11a) of the hub (12) by a plurality of fixation devices (10).

8. Wind turbine (2) according to claim 7, wherein the first bearing ring (11a) is electrically connected to an electric current bypass device (20) for providing a further conductive path from the first bearing ring (11a) to a second bearing ring (11b) of the bearing (11), thus electrically bypassing roller devices (11c) of the bearing (11).

9. Method for assembling a rotor blade (1) to a hub (12) of a wind turbine (2) and establishing a conductive path between a first down connector (6) of the rotor blade (1) and the hub (12), comprising:

providing a hub (12) with a bearing (11), the bearing (11) comprising a first bearing ring (11a) and a second bearing ring (11b), the hub (12) being mounted on a tower (18), providing a rotor blade (1) according to claim 1, wherein fixation devices (10) are provided at the root section (4) of the rotor blade (1), passing end sections of the fixation devices (10) though bores (21) of the first bearing ring (11a), and fixing the rotor blade (1) to the first bearing ring (11a) by attaching fixation nuts (10b) to the end sections of the fixation devices (10).

10. Rotor blade (1) for a wind turbine (2), the rotor blade (1) comprising a tip section (3), a root section (4) and an intermediate section (5) between the tip section (3) and the root section (4), wherein the rotor blade (1) further comprises a first down conductor (6), extending from the tip section (3) to the root section (4), wherein the first down conductor (6) is electrically coupled with a root block (7) of the root section (4), wherein the root block (7) is electrically coupled with a second down connector (8) disposed in an inner chamber 24 of the rotor blade, wherein the second down connector (8) is electrically coupled with a current distribution plate (9), wherein the current distribution plate (9) is attached to a fixation device (10) for fixing the rotor blade (1) to a first bearing ring (11a) of a bearing (11) of a hub (12), wherein the current distribution plate (9) is attached to three barrel nuts (10a) of the fixation device (10), wherein the barrel nuts (10a) are disposed in two different barrel nut rings (13) of the rotor blade (1).

11. Rotor blade (1) according to claim 10, wherein the current distribution plate (9) comprises a stress compensation section (9a) between the barrel nut rings (13).

* * * * *